United States Patent
Peiffer et al.

(10) Patent No.: US 8,302,733 B2
(45) Date of Patent: Nov. 6, 2012

(54) ACOUSTIC ABSORBER FOR AIRCRAFT ENGINES

(75) Inventors: Alexander Peiffer, Munich (DE); Rudolf Maier, Miesbach (DE)

(73) Assignee: Airbus SAS, Blagnac Cedex (FR)

( * ) Notice: Subject to any disclaimer, the term of this patent is extended or adjusted under 35 U.S.C. 154(b) by 13 days.

(21) Appl. No.: 11/718,366

(22) PCT Filed: Oct. 28, 2005

(86) PCT No.: PCT/DE2005/001936
§ 371 (c)(1),
(2), (4) Date: Aug. 2, 2007

(87) PCT Pub. No.: WO2006/047991
PCT Pub. Date: May 11, 2006

(65) Prior Publication Data
US 2008/0223655 A1  Sep. 18, 2008

(30) Foreign Application Priority Data
Nov. 2, 2004  (DE) .......... 10 2004 053 383

(51) Int. Cl.
*E04B 1/82* (2006.01)
*B31F 1/00* (2006.01)
(52) U.S. Cl. .......... 181/292; 428/116; 493/451
(58) Field of Classification Search .......... 181/292; 428/116, 117, 118; 493/451
See application file for complete search history.

(56) References Cited

U.S. PATENT DOCUMENTS

| | | | |
|---|---|---|---|
| 2,771,164 A * | 11/1956 | Scurlock | 52/404.1 |
| 2,950,656 A | 8/1960 | Gewiss | |
| 3,542,152 A | 11/1970 | Adamson et al. | |
| 3,734,234 A | 5/1973 | Wirt | |
| 3,948,346 A * | 4/1976 | Schindler | 181/286 |
| 3,960,236 A * | 6/1976 | Holmes | 181/286 |
| 4,197,341 A | 4/1980 | Rule | |
| 4,421,811 A * | 12/1983 | Rose et al. | 428/116 |
| 4,475,624 A * | 10/1984 | Bourland et al. | 181/292 |
| 4,632,862 A | 12/1986 | Mullen | |
| 4,642,993 A * | 2/1987 | Sweet | 60/752 |
| 4,832,999 A | 5/1989 | Sweet | |
| 5,028,474 A * | 7/1991 | Czaplicki | 428/178 |
| 5,041,323 A * | 8/1991 | Rose et al. | 428/116 |
| 5,064,493 A | 11/1991 | Smith, II | |
| 5,116,688 A * | 5/1992 | Minamida et al. | 428/582 |
| 5,126,183 A | 6/1992 | Smith, II | |
| 5,292,027 A * | 3/1994 | Lueke | 220/495.06 |
| 5,310,586 A | 5/1994 | Mullen | |

(Continued)

FOREIGN PATENT DOCUMENTS

DE  19606195  9/1998

(Continued)

OTHER PUBLICATIONS

English Language Abstract of DE 19606195.

(Continued)

*Primary Examiner* — Jeremy Luks
(74) *Attorney, Agent, or Firm* — Greenblum & Bernstein, P.L.C.

(57) ABSTRACT

The present invention relates to an acoustic absorber that is particularly suitable for aircraft engines and has a honeycomb-shaped 3-dimensional structure, which absorbs engine noise when used in an engine. The structure has a plurality of folded honeycomb structures formed by folding a flat semi-finished product.

14 Claims, 3 Drawing Sheets

U.S. PATENT DOCUMENTS

| | | | | |
|---|---|---|---|---|
| 5,380,579 | A | * | 1/1995 | Bianchi ........................ 428/184 |
| 5,389,059 | A | * | 2/1995 | Corwin ........................ 493/355 |
| 5,431,980 | A | | 7/1995 | McCarthy |
| 5,922,438 | A | * | 7/1999 | Scharkowski ................ 428/116 |
| 5,947,885 | A | | 9/1999 | Paterson |
| 6,135,238 | A | * | 10/2000 | Arcas et al. ................... 181/292 |
| 6,182,787 | B1 | * | 2/2001 | Kraft et al. .................... 181/292 |
| 6,183,837 | B1 | * | 2/2001 | Kim ................................ 428/118 |
| 6,726,974 | B1 | * | 4/2004 | Pflug et al. ...................... 428/73 |
| 6,871,725 | B2 | | 3/2005 | Johnson |
| 2003/0098200 | A1 | * | 5/2003 | Clark ............................ 181/292 |
| 2004/0102303 | A1 | * | 5/2004 | Kehrle .......................... 493/463 |
| 2004/0163888 | A1 | | 8/2004 | Johnson |

FOREIGN PATENT DOCUMENTS

| | | |
|---|---|---|
| EP | 0314261 | 5/1989 |
| JP | 4-506184 | 10/1992 |
| JP | 7-139429 | 5/1995 |
| JP | 10-509098 | 9/1998 |
| RU | 1 830 326 | 7/1993 |
| SU | 415 177 A1 | 2/1974 |

OTHER PUBLICATIONS

German Office Action (in German only) is attached hereto. Listed documents 1 and 2 were previously cited by Applicant in an IDS. Listed document 3 is believed to be a counterpart of EP 0 314 261.
English Translation of the German Office Action is attached hereto which was previously cited by Applicant in an IDS filed Nov. 2, 2010.
English translation of Japan Office action, dated Oct. 26, 2010.

* cited by examiner

Prior art					Fig. 2a

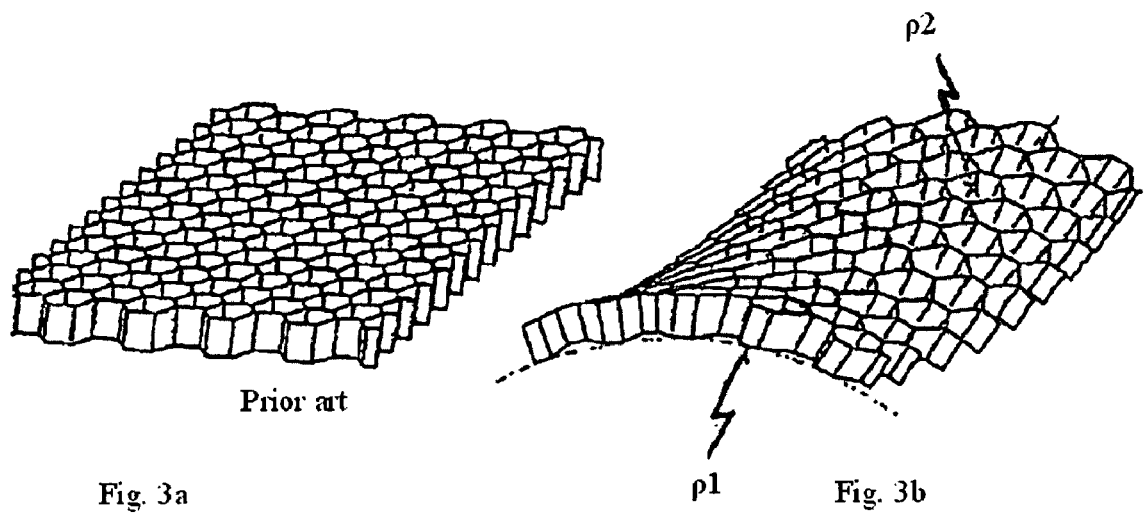
Prior art
Fig. 3a
Fig. 3b
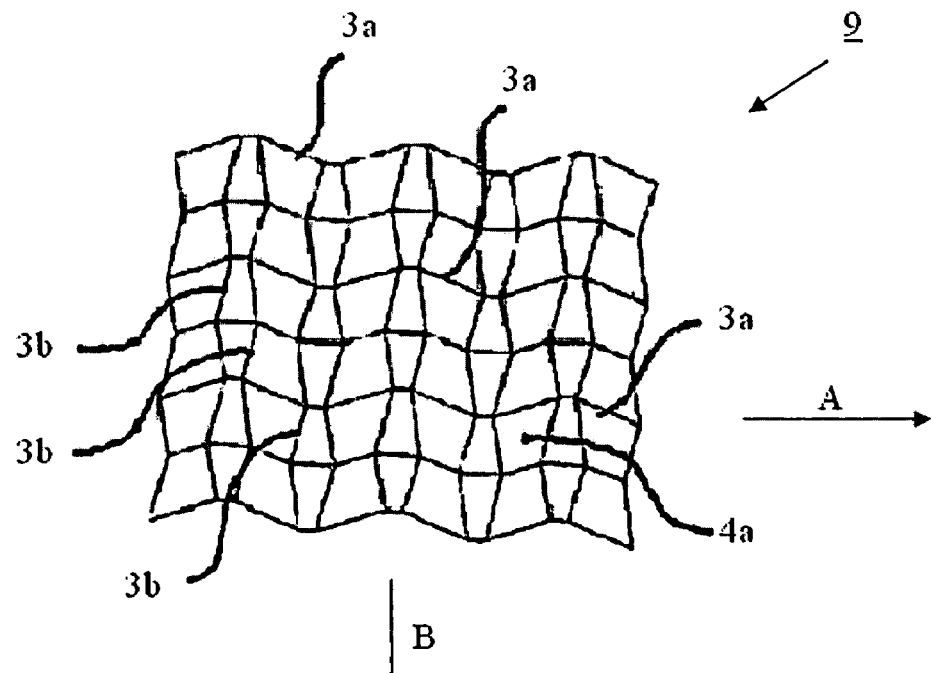
Fig. 4

ACOUSTIC ABSORBER FOR AIRCRAFT ENGINES

CROSS-REFERENCE TO RELATED APPLICATIONS

The present application is a U.S. National Stage of International Patent Application No. PCT/DE2005/001936 filed Oct. 28, 2005, and claims priority under 35 U.S.C. §119 of German Patent Application No. 10 2004 053 383.0 filed Nov. 2, 2004.

BACKGROUND OF THE INVENTION

1. Field of the Invention

The present invention relates to an acoustic absorber that is particularly suitable for engines of aircraft and, in particular, has a honeycomb-shaped 3-dimensional structure which absorbs engine noise when used in an engine. The invention further relates to a particular use of folded honeycomb structures.

2. Discussion of Background Information

Engines in general, and in particular aircraft engines, have the problem of a high noise emission. There is a strong noise emission in the engine intake, particularly with engines having a high partial-flow ratio. Blade tip speeds of more than Mach1 cause, e.g., shock waves that excite acoustic eigenmodes in the intake duct. These modes radiate outward very effectively and cause a very loud noise. This noise, also called "buzz-saw noise," is perceived particularly intensely during the take-off phase of an aircraft in the vicinity of the airport. But the noise also penetrates into the passenger cabin of the aircraft itself, and is perceived by the passengers, in particular in the front section. Further noise proportions occur with frequent passage of a blower or fan blade, as well as the harmonics from the blower or fan blade. Additional noise proportions also come from broadband noise as well as from other engine stages such as, e.g., a compressor.

In order to control this noise in the intake duct or in an engine's partial-flow duct, absorbing surfaces are usually attached in the area of the engine intake as passive sound absorbers. So-called "single degree of freedom" or SDOF absorbers are thereby predominantly used, and these absorbers are essentially composed of a honeycomb structure covered by a perforated sheet or a fine-meshed wire netting. The honeycomb structure acts as a resonator, whereby the structural depth of the honeycomb structure is adapted to the wavelength and is a quarter of the wavelength. Thus, SDOF absorbers of this type are particularly effective at a resonance frequency.

Absorbers were developed that are composed of two or three SDOF absorbers connected in series to render possible a wider broadband noise damping. Absorbers of this type are also referred to as 2-DOF absorbers or 3-DOF absorbers. Furthermore, attempts were made to connect absorbers of various structural depth in parallel.

For the purpose of illustration, FIG. 2a shows a known SDOF absorber with a plurality of honeycombs 1 arranged between a lower surface layer 2 and an upper surface layer 3. FIG. 2b shows a known 2-DOF absorber with two layers of honeycombs 1a, 1b lying on top of one another under the surface layer 3.

With the known absorbers, there is the problem that large-area curved structures can be manufactured only in a very complex manner, which entails high costs. Current honeycomb-core absorbers in engines have the particular disadvantage that they do not cover the entire surface of the intake. One reason for this is the so-called saddle effect, which is the reason that honeycombs cannot be curved arbitrarily. Thus the effective surface is not utilized, and the noise in the engine intake cannot be absorbed or reduced sufficiently.

For the purpose of illustration, FIGS. 3a and 3b show the saddle effect. When a flat honeycomb structure according to FIG. 3a is attempted to be curved, then the geometry of the honeycombs forms a saddle-like structure with a first or inner radius of curvature $\rho 1$ and a second radius of curvature $\rho 2$, which forms a saddle-like indentation of the honeycomb structure.

There is the additional problem that the honeycombs cannot be interlocked with one another, which makes a seamless manufacture even more difficult. Furthermore, because of their manufacturing process, the honeycombs cannot be positioned precisely, which is why, e.g., required perforation holes are covered in many cases. This applies in particular to MDOF absorbers (MDOF=multiple degree of freedom) with several degrees of freedom, which absorbers require a very precise positioning of the intermediate layers. This means that the honeycomb layers lying on top of one another must be positioned particularly precisely. With absorbers of this type, the above-mentioned saddle effect is of particular impact because it causes a lateral displacement of the respective honeycomb to the surface layers and intermediate layers.

So far MDOF absorbers have always had to be manufactured by sandwich constructions with several cores. This increases costs and requires a very precise alignment of the honeycombs to the perforated intermediate layers. Furthermore, honeycombs are set to a fixed cell size. This means that it is not possible to realize absorber structures with variable volumes.

SUMMARY OF THE INVENTION

One aspect of the present invention is to generate an acoustic absorber, with which the saddle effect is avoided when large-area, curved structures are formed. The absorber is to be suitable in particular for engines of aircraft, and to render possible a high precision for the absorber elements primarily in engine intakes.

Another aspect is attained by an acoustic absorber for engines, in particular of aircraft, with a honeycomb-shaped 3-dimensional structure, which absorbs noise of the engine when used in an engine. The structure comprises folded honeycomb structures formed by folding a flat semi-finished product.

Yet another aspect is attained by the use of folded honeycomb structures as an acoustic absorber element, whereby the folded honeycomb structures are formed by folding a flat semi-finished product as an acoustic absorber element, in particular for engines of aircraft. Further advantageous features, aspects, and details of the invention are disclosed by the dependent claims, the specification, and the drawings.

The acoustic absorber according to the invention is suitable in particular for aircraft engines and has a honeycomb-shaped 3-dimensional structure which absorbs engine noise when used in an engine. The structure comprises folded honeycomb structures that are formed by folding a flat semi-finished product.

The use of folded honeycomb structures, which are generated by folding a flat semi-finished product, makes it possible to manufacture large-area curved structures as absorbers or absorber elements. In this way, the saddle effect is avoided because of the geometry of the foldings. In particular, because of their structural properties, folded honeycomb structures can be adjusted to curved 3-dimensional geometries from the beginning. The folding produces, e.g., 3-dimensional core structures that can be adjusted arbitrarily by different folding patterns. Furthermore, the absence of the saddle effect renders possible a precise positioning of the core to the surface layers of the absorber. Individual absorber elements formed of folded honeycomb structures can be interlocked with one another without any problems, which leads to an increased precision.

Advantageously, the structure formed of folded honeycomb structures is a 3-dimensional core structure with a predefined folding pattern. Different folding patterns make it possible to obtain any desired curvatures of the finished absorber or absorber element. This makes possible a precise adaptation and positioning, primarily in engines of aircraft and in particular in the engine intakes, which results in improved noise absorption.

Advantageously, several of the honeycomb-like structures overlap one another. But they can also be interlocked with one another. A higher precision in the positioning of the absorber elements is thus achieved.

Preferably, the acoustic absorber comprises one or more perforated surfaces, whereby the perforated surfaces are formed of partial surfaces of the flat semi-finished product. This further reduces the effort during production and thus lowers the costs. At the same time, the perforated surfaces are located at the precisely predefined positions of the absorber.

Preferably, the acoustic absorber has two volume areas physically separated from one another, wherein the areas are formed by the folded honeycomb structures and are embodied on different or opposite sides of the absorber. This means that, due to their fundamental properties, folded honeycomb structure cores, for example, separate the space formed by them into two volume areas, whereby, e.g., one volume area is adjacent to an upper surface layer and another volume area is adjacent to a lower surface layer. It is thus rendered possible to manufacture, in particular, multi-dimensional absorbers such as, e.g., 2-DOF absorbers in a particularly simple and cost-effective manner. The perforation and the positioning of the center layer required with previous MDOF absorbers are omitted. The perforation can instead be applied to the surfaces of the non-folded flat semi-finished product, i.e., before the folding and the forming of the folded honeycomb structures. This renders possible a very precise and variable design of 2-DOF absorbers or 2-DOF systems.

Preferably, the folded honeycomb structures have one or more predefined folding geometries, which are adapted or can be adapted, e.g., to the circumference or to the intake depth of the respective engine. This means that the different folding geometries make it possible to vary the volume size and volume depth of the folded honeycomb structures over the circumference and the intake depth. An even greater flexibility in the absorber's design is thus achieved.

The possibility of setting or choosing certain folding patterns from which the folded honeycomb structures are formed also renders possible, e.g., core structures that can be ventilated or a coupling of adjacent chambers.

In addition, the folded honeycomb structures make it possible to overlap honeycomb structures produced separately and interlock them with one another in a simple manner, which renders possible a nearly seamless construction.

According to one aspect of the invention, folded honeycomb structures formed by folding a flat semi-finished product are used as an acoustic absorber element, in particular for aircraft engines. In terms of their geometry, the folded honeycomb structures are thereby advantageously designed such that they are suitable to absorb an aircraft's engine noise. The folded honeycomb structures are used in particular to form or produce an acoustic absorber according to the invention.

Advantages and features mentioned in connection with the acoustic absorber also apply to the particular use of folded honeycomb structures according to the present invention.

BRIEF DESCRIPTION OF THE DRAWINGS

The invention is explained below by way of example on the basis of the figures; they show:

FIGS. 3a and b A view of a honeycomb structure of a known acoustic absorber in the flat state (FIG. 3a) and in the curved state (FIG. 3b) to illustrate the saddle effect;

FIG. 4 A flat folding pattern to form the core shown in FIG. 1;

DETAILED DESCRIPTION OF THE PRESENT INVENTION

Figure 1:
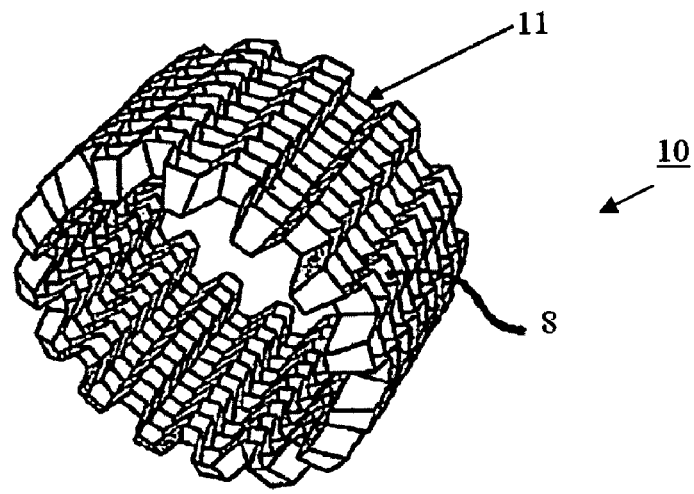
FIG. 1 A view of an acoustic absorber according to a preferred embodiment of the invention, wherein the acoustic absorber is embodied as a curved core.
Figure 2B:
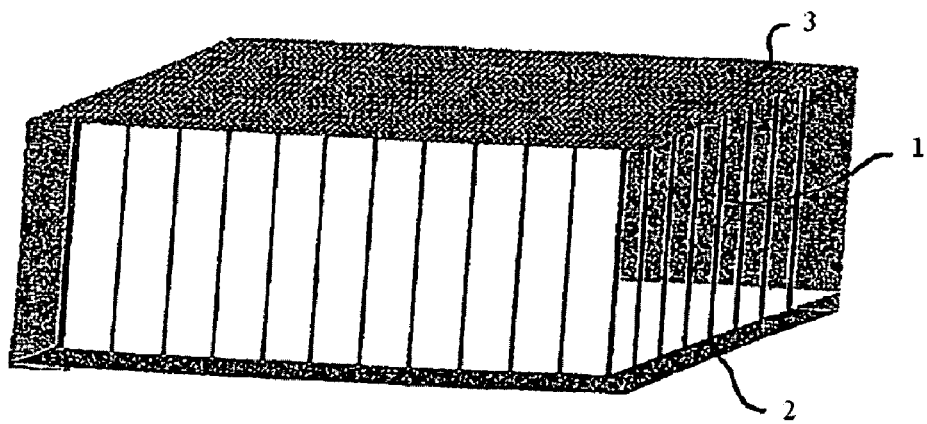
FIGS. 2a and b An SDOF absorber and a 2-DOF absorber according to the prior art.
Figure 2B:
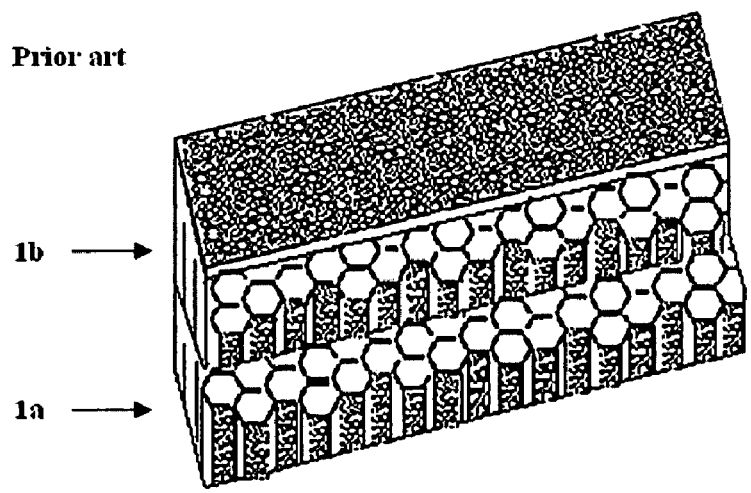

FIG. 1 represents an acoustic absorber 10 as a preferred embodiment of the invention. The acoustic absorber 10 has a honeycomb-shaped 3-dimensional structure 11. The honeycomb structure 11 forms a curved core, the form of which is embodied to be used in the intake of engines. For this purpose, the honeycomb-shaped 3-dimensional structure 11 is curved such that it forms a ring. This means that the wall of the ring is composed of the 3-dimensional honeycomb structure 11.

The structure or the honeycomb structure 11 comprises a plurality of folded honeycomb structures 8 formed by folding a flat semi-finished product.

FIG. 4 shows a flat semi-finished product 9, from which the absorber's 11 honeycomb structures 8 (see FIG. 1) are formed by folding. For this purpose, the semi-finished product 9 has a defined suitable folding pattern composed of a plurality of folding lines 3a, 3b, which run in a zigzag manner in two main directions A, B directed essentially perpendicular to one another. The folding lines 3a along the main direction A and the folding lines 3b along the main direction B thereby respectively run essentially parallel to one another. The course of the folding lines 3a, 3b in the flat or 2-dimensional semi-finished product 9, forms geometrical patterns in the form of trapezoids that regularly repeat themselves. The patterns 4a are thereby shaped such that the folded honeycomb structures 8 (see FIG. 1) form along the folding lines 3a, 3b with a suitable folding of the flat semi-finished product 9. This means that a 3-dimensional honeycomb structure with folded honeycomb structures is produced on the basis of the defined geometrical folding pattern by folding the flat or 2-dimensional semi-finished product, wherein the honeycomb structure is first embodied in a plate-like manner and has a thickness defined by the size of the individual folded honeycomb structures 8 or honeycomb elements.

The folded honeycomb structures 8 of the core shown in FIG. 1 act as resonators for the sound waves to be absorbed, and are embodied accordingly in terms of their size and geometry in accordance with their respective requirements.

The manufacture of folded honeycomb structures by folding is known per se and described in detail, e.g., in U.S. Pat. No. 2,950,656 and U.S. Pat. No. 5,947,885. This method is used according to the invention to form the acoustic absorber 10 without a saddle effect.

In order to form the folded honeycomb structures 8, a flat, thin material is provided with folds in different directions, wherein the folds are formed by a plurality of zigzag-like folding lines. The individual surface elements of the folded honeycomb structures can be, e.g., parallelograms, trapezoids, triangles, etc., or a combination of various geometrical forms.

Figure 5:
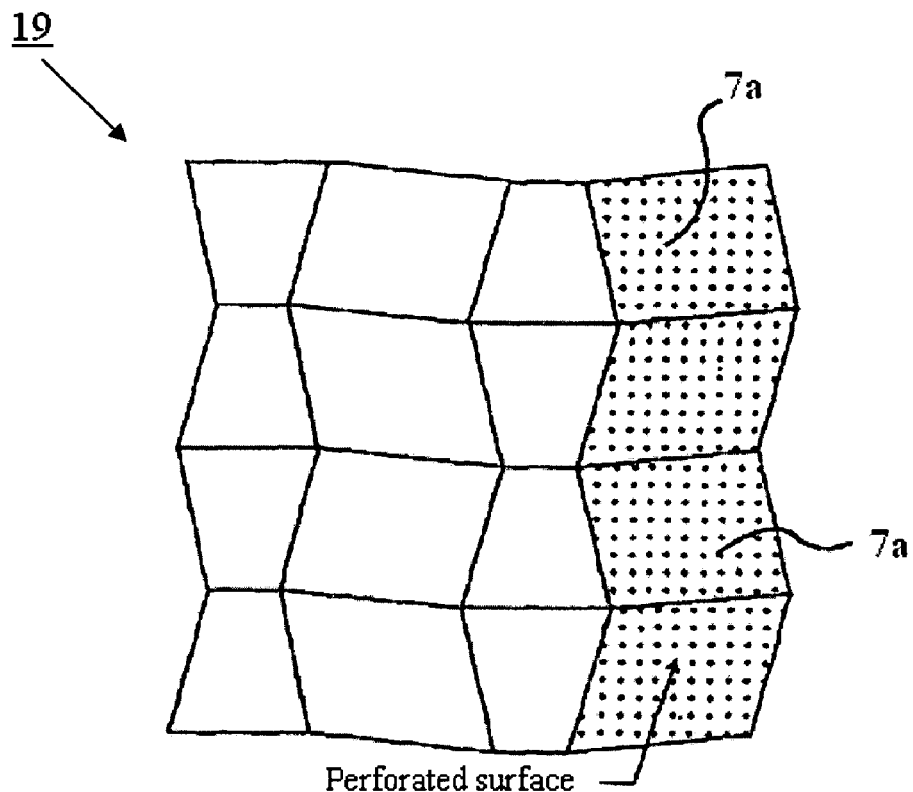
FIG. 5 A view of a folding pattern on a flat semi-finished product with perforated partial surfaces, from which the acoustic absorber according to the invention is formed.

FIG. 5 shows a flat semi-finished product 19, partial surfaces 7a of which are perforated. In terms of the further features, the flat semi-finished product 19 corresponds to the flat semi-finished product 9 (see FIG. 4) already described above. The perforation of the partial surfaces 7a simplifies the production of the absorber elements even further, and the known problems during positioning are avoided.

After the folding of the flat semi-finished products 9 or 19 shown in FIGS. 4 and 5, 3-dimensional honeycomb structures are produced that are shaped in a plate-like manner and have a plate thickness defined by the size of the individual folded honeycomb structures. Subsequently, the honeycomb structures are curved so that they are adapted to a predefined 3-dimensionally shaped surface. Because of the special honeycomb geometry, no undesired stresses occur with the curving of the folded honeycomb structures, e.g., to form the ring-like core shown in FIG. 1, thereby avoiding the known saddle effect. The individual folds predefined in the flat semi-finished product 9, 19 by the folding lines 3a, 3b are flexible and allow for an adaptation of the folding angles when the 3-dimensional honeycomb structure 11 is curved. This means that the individual folded honeycomb structures 8 (see FIG. 1) are not rigid, since they are produced by folding a flat semi-finished product 9, 19, and instead they are flexible and allow for an adaptation of the angles between individual wall elements of the folded honeycomb structures 8.

Depending of the requirements of the individual case the, e.g., curved honeycomb structures 11 are provided with, e.g., one or more surface layers, which are, e.g., perforated and can be arranged on both sides of the honeycomb structure 11. In the design of the absorber with folded honeycomb structures, different honeycomb structures 11 can be produced and arranged to be overlapping or interlocked with one another to form any absorber in terms of size and geometry, in particular for aircraft engines.

Several honeycomb structures formed, e.g., from the semi-finished product 19 with the perforated partial surfaces 7a can be arranged on top of one another, whereby no additional center layer with perforations is required, as the perforations have already been applied to the partial surfaces 7a of the as yet non-folded semi-finished product 9. A 2-DOF absorber with a broadband effect is thus produced, where the absorber is relatively cost-effective and can be manufactured in a precise manner. The total volumes of the individual folded honeycomb structures 8 and their extension or depth is determined by the respective folding geometries and can be varied over the intake depth of the engine and over the circumference. A particularly effective sound absorption with an increased waveband is thus achieved in the engine.

Figure 6:
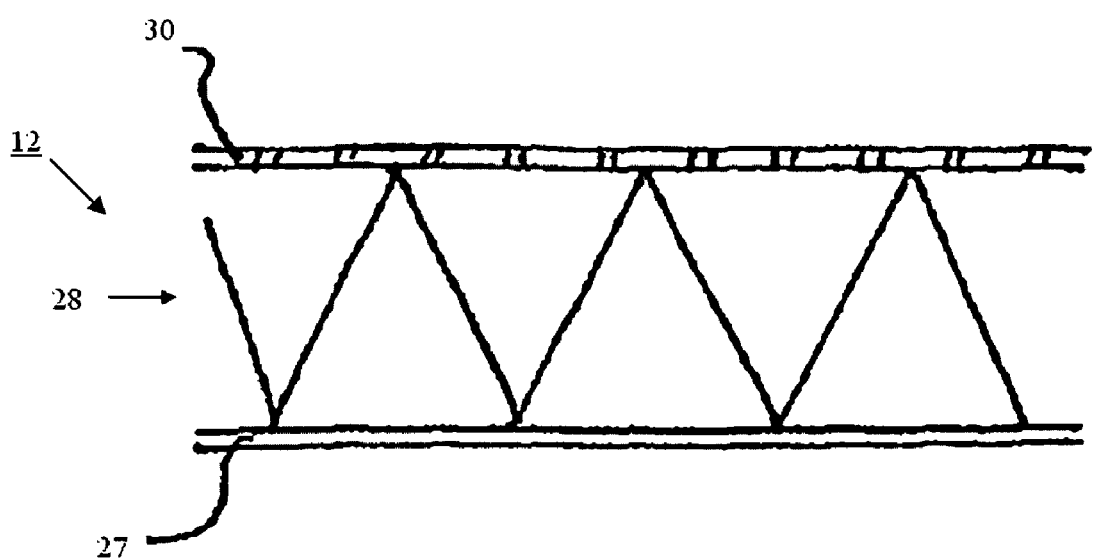
FIG. 6 An absorber with a layer of folded honeycomb structures in a sectional view.

FIG. 6 shows a section through an absorber 12 with a honeycomb structure of folded honeycomb structures 28, where the honeycomb structure is arranged between a back layer 27 and a perforated surface layer 30. As described above, the folded honeycomb structures 28 are formed from the semi-finished product by folding. Because of the embodiment of the folded honeycomb structures, two volume areas separated from one another are created in the honeycomb structure, so that a 2-DOF absorber is formed with only one honeycomb structure layer.

Several absorbers 12 can be stacked on top of one another to form multi-dimensional absorbers, e.g., 4-DOF, 6-DOF, 8-DOF absorbers, etc., whereby the honeycomb structure layers are respectively separated from one another by a perforated layer 30.

A coupling of adjacent chambers or folded honeycomb structures 8, or 27, 28 can be achieved in a targeted and simple manner by the predefined perforations already provided in the flat semi-finished product 19. Furthermore, the folding of perforated semi-finished products also renders possible, e.g., ventilated core structures, i.e., honeycomb-like 3-dimensional structures 11 are created, wherein individual areas or honeycombs are coupled to one another or ventilated through perforations in a targeted manner.

The invention claimed is:

1. A method for forming an aircraft engine intake acoustic absorber for an engine, comprising:
   folding a one-piece flat semi-finished product along zigzag fold lines arranged cross-wise to each other to form 3-dimensional honeycomb structures; and
   forming a bent curved core by bending the flat semi-finished product with overlapping 3-dimensional honeycomb structures such that the 3-dimensional honeycomb structures of one end of the bent curved core overlap and interlock with the 3-dimensional honeycomb structures of another end of the bent curved core,
   wherein each 3-dimensional honeycomb structure is formed by folding the one-piece flat semi-finished product to form walls defining each 3-dimensional honeycomb structure, and
   wherein the bent curved core assumes the form of the aircraft engine intake acoustic absorber while avoiding a saddle effect and is structured and arranged to absorb aircraft engine noise.

2. The method for forming an acoustic absorber of claim 1, further comprising arranging the 3-dimensional honeycomb structures along at least one of a circumference or an intake depth of the engine.

3. The method for forming an acoustic absorber of claim 1, further comprising defining at least one folding geometry according to at least one of a circumference and an intake depth of the engine.

4. The method for forming an acoustic absorber of claim 1, wherein the one-piece product has no straight fold lines through the one-piece product.

5. The method for forming an acoustic absorber of claim 1, wherein the zigzag fold lines in the unfolded one-piece product cross each other and foam trapezoids that regularly repeat themselves.

6. The method for forming an acoustic absorber of claim 1, wherein the aircraft acoustic absorber comprises plural flat semi-finished products whose ends overlap and interlock with one another and wherein the 3-dimensional honeycomb structures are predefined 3-dimensional honeycomb structures specifically adapted to a shape of the aircraft engine intake.

7. An aircraft engine intake acoustic absorber for engines, comprising:
   a one-piece flat semi-finished member having crossing zigzag fold lines arranged cross-wise to each other and being folded along the crossing zigzag fold lines to form 3-dimensional structures; and each 3-dimensional structure having a bottom and surrounding side walls arranged between the bottom and an upper end arranged opposite the bottom, wherein a bent curved core includes the flat semi-finished member and has the form of a ring-shaped aircraft engine intake acoustic absorber while avoiding a saddle effect and is structured and arranged to absorb aircraft engine noise, and wherein the bent curved core comprises overlapping 3-dimensional honeycomb structures such that the 3-dimensional honeycomb structures of one end of the bent curved core overlap and interlock with the 3-dimensional honeycomb structures of another end of the bent curved core.

8. The method of claim 1, further comprising arranging at least one of an upper and a lower surface layer on one side of the bent curved core.

9. The method of claim 8, wherein at least one of the upper and the lower surface layers are perforated.

10. The acoustic absorber for engines of claim 7, wherein the aircraft acoustic absorber comprises plural flat semi-finished members whose ends overlap and interlock with one another and wherein the 3-dimensional structures are predefined 3-dimensional honeycomb structures specifically adapted to a shape of the aircraft engine intake.

11. The acoustic absorber for engines of claim 7, wherein the one-piece member has no straight fold lines through the one-piece member.

12. The acoustic absorber for engines of claim 7, wherein the zigzag fold lines in the unfolded one-piece member form trapezoids that regularly repeat themselves.

13. The acoustic absorber for engines of claim 7, further comprising at least one of an upper and a lower surface layer arranged on one side of the bent curved core.

14. The acoustic absorber for engines of claim 13, wherein at least one of the upper and the lower surface layers are perforated.

* * * * *